United States Patent [19]

Hall et al.

[11] Patent Number: 5,700,131

[45] Date of Patent: Dec. 23, 1997

[54] COOLED BLADES FOR A GAS TURBINE ENGINE

[75] Inventors: Kenneth B. Hall, Jupiter; Robert J. McClelland; Thomas A. Auxier, both of Palm Beach Gardens, all of Fla.

[73] Assignee: United Technologies Corporation, Hartford, Conn.

[21] Appl. No.: 236,093

[22] Filed: Aug. 24, 1988

[51] Int. Cl.$^6$ ........................................................ F01D 5/18
[52] U.S. Cl. ................................................ 416/97 R; 416/92
[58] Field of Search ........................... 416/92, 96 A, 416/97 R, 97 A

[56] References Cited

U.S. PATENT DOCUMENTS

| | | | |
|---|---|---|---|
| 3,810,711 | 5/1974 | Emmerson et al. | 416/97 A |
| 3,885,886 | 5/1975 | Richter | 416/97 R |
| 3,994,622 | 11/1976 | Schultz et al. | 416/96 A |
| 4,118,146 | 10/1978 | Dierberger | 416/97 A |
| 4,171,184 | 10/1979 | Lings et al. | 416/96 A |
| 4,221,539 | 9/1980 | Corrigan | 416/97 A |
| 4,321,010 | 3/1982 | Wilkinson et al. | 416/96 A X |
| 4,424,001 | 1/1984 | North et al. | 416/97 R X |
| 4,753,575 | 6/1988 | Levengood et al. | 415/115 X |
| 4,761,116 | 8/1988 | Braddy et al. | 416/92 |
| 4,770,608 | 9/1988 | Anderson et al. | 416/97 R |
| 4,818,178 | 4/1989 | Sibbertson | 415/115 |
| 4,820,122 | 4/1989 | Hall et al. | 416/97 R |
| 4,820,123 | 4/1989 | Hall | 416/97 R |
| 4,992,026 | 2/1991 | Ohtomo et al. | 416/97 R |

FOREIGN PATENT DOCUMENTS

| | | | |
|---|---|---|---|
| 104506 | 8/1980 | Japan | 416/97 R |

*Primary Examiner*—Michael J. Carone
*Assistant Examiner*—Christopher K. Montgomery
*Attorney, Agent, or Firm*—Norman Friedland

[57] ABSTRACT

An internally cooled turbine blade for a gas turbine engine is modified at the leading and trailing edges to include a dynamic cool air flowing radial passageway with an inlet at the root and a discharge at the tip feeding a plurality of radially spaced film cooling holes in the airfoil surface. Replenishment holes communicating with the serpentine passages radially spaced in the inner wall of the radial passage replenish the cooling air lost to the film cooling holes. The discharge orifice is sized to match the backflow margin to achieve a constant film hole coverage throughout the radial length. Trip strips may be employed to augment the pressure drop distribution

5 Claims, 1 Drawing Sheet

COOLED BLADES FOR A GAS TURBINE ENGINE

CROSS REFERENCE

The subject matter of this application is related to the subject matter of commonly-owned U.S. patent application Ser. Nos. 07/236,092 and 07/236,094 filed on even date herewith and entitled "Cooled Blades for a Gas Turbine Engine" and "Clearance Control for the Turbine of a Gas Turbine Engine", now U.S. Pat. No. 5,478,277, and, abandoned, respectively.

DESCRIPTION

1. Technical Field

This invention relates to gas turbine engines and particularly to internally cooled rotor blades.

2. Background Art

As is well known, the aircraft engine industry is experiencing a significant effort to improve the gas turbine engine's performance while simultaneously decreasing its weight. Obviously, the ultimate goal is to attain the optimum thrust-to-weight ratio that is available. Of course, one of the primary areas of concentration is the "hot section" of the engine since it is well known that engine's thrust-to-weight ratio is significantly improved by increasing the temperature of the turbine gases. However, turbine gas temperature is limited by the metal temperature constraints of the engine's components. Significant effort has, to date, been made in achieving higher turbine operating temperatures by adapting significant technological advances in the internal cooling of the turbine blades. Examples of a few of the many accomplishments in this area are exemplified in U.S. Pat. Nos. 3,533,711 granted to D. M. Kirchon on Oct. 13, 1966, 4,073,599 granted to Allen et al on Feb. 14, 1978, and 4,180,373 granted to Moore et al on Dec. 25, 1979, which latter patent is assigned to the same assignee as this patent application.

The disclosure in U.S. patent application Ser. No. 812,108 filed on Dec. 23, 1985 by L. R. Anderson and T. A. Auxier and assigned to the same assignee as this patent application is worthy of note. In this patent application the blade is formed with an internal radial passage that feeds the film cooling holes. The internal wall defining the radial passage includes a plurality of radially spaced holes that communicate with the cooling air in the interior of the blade. The radial passage is closed at the bottom so that the cooling air in the passage is static rather than dynamic. That is, there is no flow stream in the passage extending from the root to the tip of the blade, but rather the flow is through the hole in the inner wall, through the lateral space provided by the radial passage and then out of the adjacent film cooling hole.

In the blade according to the present invention the radial passages are opened at the root section to the supply pressure so that there is a constant flow in this passage(s) from the root to the tip of the blade. A portion of the cooling air is discharged through the film cooling holes while a portion is discharged through opening(s) formed at the tip. This is a dynamic flow passage. As the cooling air proceeds radially toward the tip, a portion discharges through the film cooling holes and is replenished by the air admitted through the cooling air replenishment holes in the internal wall defining the passage. The desired backflow margin and radial flow can be preascertained by proper sizing of the hole(s) at the tip of the blade and utilizing flow impediments in the flow stream such as trip strips. In addition to achieving cooling at reduced supply pressure levels, air flowing into the radial passage is used to impinge on the back surface of the airfoil of the blade for cooling purposes and the flow out at the tip of the passage is used to cool the tip portion of the blade.

The blade incorporating the invention inherently attains a dirt separation feature since the air turns 90° and the air in the passages is centrifuged by the rotational movement of the blade.

SUMMARY OF THE INVENTION

An object of this invention is to provide an improved turbine blade for a gas turbine engine.

A feature of this invention is to provide radial passages adjacent the airfoil of a turbine blade that is vented to supply pressure at the root and flows cooling air to an aperture at the tip of the blade. The cooling air in the radial passage feeds the film cooling holes and is replenished with additional cooling air through cooling air replenishment holes spaced radially in the internal wall defining the radial passage. The cooling effect is obtained with less cooling air and at lower pressure levels.

A feature of this invention is to predetermine the back pressure in the radial passage by properly sizing the hole at the tip of the radial passage and incorporating trip strips. Improved film cooling is achieved by maintaining proper backflow margin throughout the radial extent of the radial passage to minimize flow through all of the film cooling holes communicating with this radial extent.

A still further feature is to provide an improved internal cooled turbine blade with dirt tolerance capabilities.

The foregoing and other features and advantages of the present invention will become more apparent from the following description and accompanying drawing.

BEST MODE FOR CARRYING OUT THE INVENTION

Figure 1:
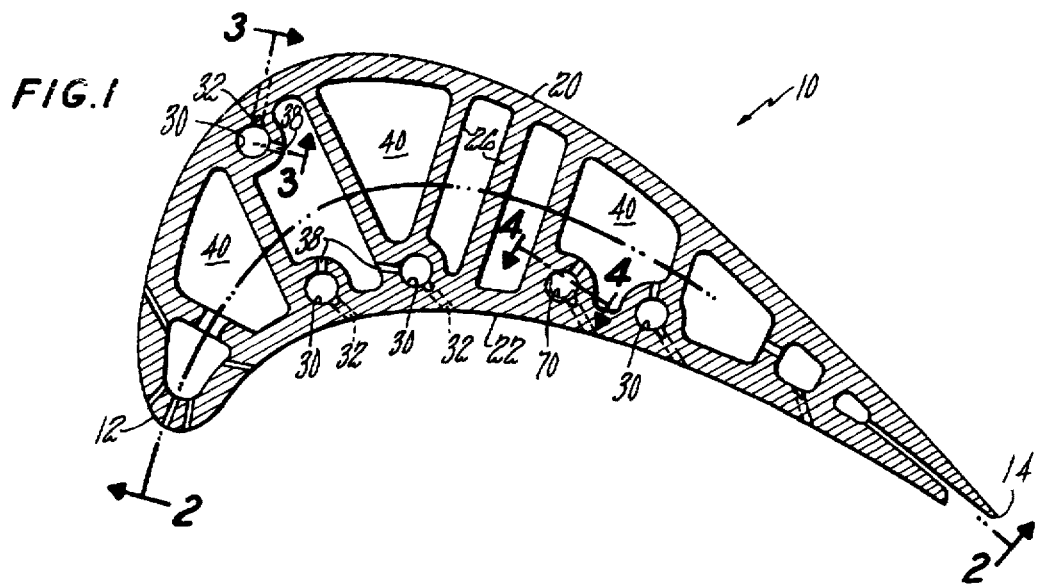
FIG. 1 is a cross-sectional view of an axial flow turbine blade incorporating this invention.

While the preferred embodiment describes a typical turbine blade for a gas turbine engine of the type used on the F100 engine manufactured by Pratt & Whitney Aircraft, a division of United Technologies Corporation, the assignee of this patent application, it is to be understood that this invention is applicable to other types of air cooled turbine blades.

As used herein the term "backflow margin" is the pressure ratio measured across any of the cooling air discharge holes on the airfoil surface of the blade. Only portions of the blade are shown herein for the sake of simplicity and convenience, it is to be understood that the highly developed techniques for enhancing heat transfer, such as pedestals, trip strips and the like, are omitted herefrom.

As shown, the blade generally indicated by reference numeral 10 is fabricated from any of the well-known high temperature alloys and is comprised of a sheath defining a leading edge 12, trailing edge 14, tip 16 and root 18. The blade is contoured to define the airfoil surface having a suction side 20 (lower pressure) and pressure side 22. A plurality of holes is formed in the airfoil surface to achieve the desired cooling. Ideally, the cooling air over a good portion of the airfoil section is flowed from these holes to form a film that acts as a barrier between the airfoil surface and the hot gases in the engine's gas path.

Figure 2:
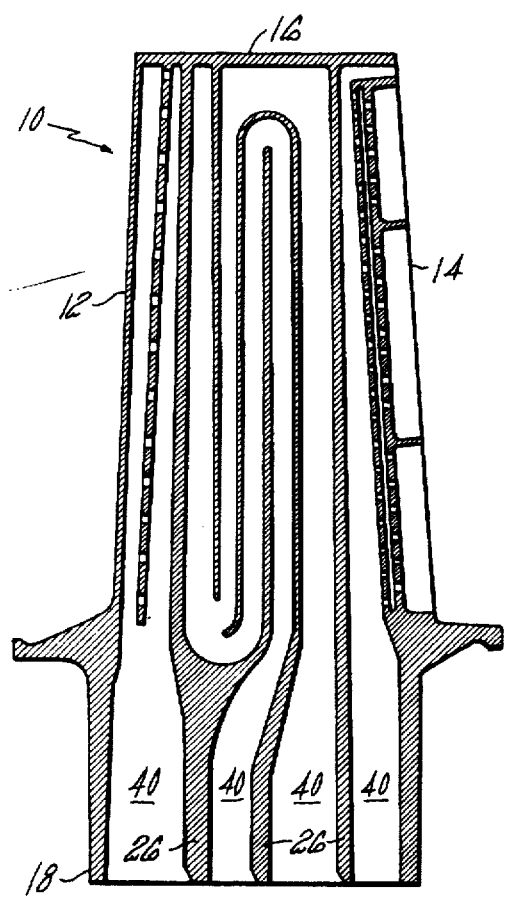
FIG. 2 is a sectional view taken along lines 2—2 of FIG. 1.

The section view of FIG. 2 showing the internal passages of the blade through a plane passing through the center (mid chord section) exemplifies generally used blade cooling technology by including several cooling passages defined by the ribs 26 that serve to flow the air in a serpentine fashion to achieve optimum convective cooling. The invention is adapted to be utilized with this type of cooling technique although it is not limited thereto.

Figure 3:
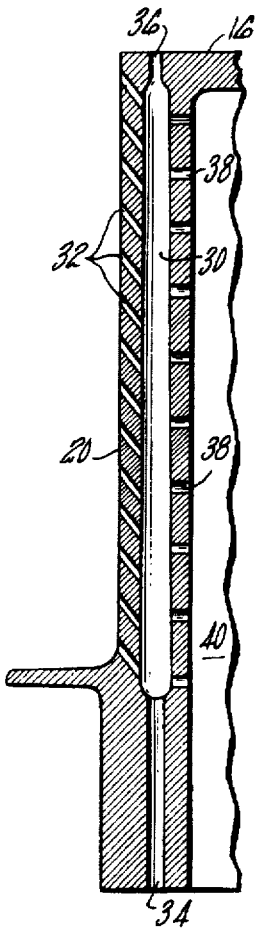
FIG. 3 is a partial view in section taken along lines 3—3 of FIG. 1.

The inventive concept is shown in FIGS. 1 and 3 which show the cooling air feed channels 30 formed at desired locations adjacent the airfoil surfaces at the suction side and pressure side. For the sake of convenience and simplicity only one cooling air channel will be described and that is the one through which the section 3—3 is depicted in FIG. 3.

In accordance with this invention, the cooling air feed channel 30 is a generally cylindrically shaped radially extending passageway formed adjacent the airfoil surface and includes a plurality of radially spaced film cooling holes 32 formed in the airfoil. Cooling air from an inlet opening 34 formed at the root of the blade flows radially toward the discharge orifice 36 formed at the tip of the blade while a portion of the cooling air flows through the film cooling holes 32. Hence, the flow in feed channel 30 is dynamic rather than static and, as will be explained hereinbelow, the feed channel 30 is continuously replenished with cooling air.

The diameter of discharge orifice 36 is sized to attain a desired backflow margin and radial flow. This serves to provide the desired pressure ratio across each of the film cooling holes 32 so as to optimize the film cooling effectiveness of each of the holes extending throughout the radial expanse. It also serves to provide sufficient flow at a desired pressure to cool the tip of the blade. As would be apparent to one skilled in the art, the feed channel 30 could include other heat transfer means such as trip strips, to enhance cooling of the blade which would also affect the pressure drop in the passage and influence the backflow margin and radial flow.

As mentioned above the feed channel 30 is replenished with cooling air through the replenishment cooling holes 38 which are in communication with the air flowing in the serpentine passages 40 defined by the ribs 26. Hence, feed channel 30 receives cooling air from both the source of cooling air admitted through the inlet 34 at the root of the blade (which is typically compressor discharge air) and the replenishment cooling air admitted through the replenishment holes 38 extending the radial extent of the feed channel 30. Since the cooling air in the feed channel 30 is being depleted as the air progresses toward the tip, the lost cooling air is replenished by the air being admitted thereto through the replenishment holes 38. This concept lends itself to controlling the pressure ratio across all of the film cooling holes across the airfoil surface extending from the root to the tip. Hence, since flow is minimized owing to the backflow margin that is matched radially, the coverage of the film holes will be constant throughout this length.

Figure 4:
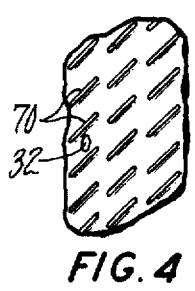
FIG. 4 is a partial view in section taken along lines 4—4 of FIG. 1 illustrating the invention using skewed trip strips.

As mentioned above the pressure drop in the feed channel can further be modified by adding trip strips which also tend to enhance heat transfer effectiveness. Reference should be made to FIG. 4 which shows a portion of feed channel 30 modified to include the skewed trip strips 70

In heretofore known designs, it was necessary to introduce the cooling air at the inlet at a significantly higher pressure in order to assure there would be ample pressure approaching the tip of the blade. However, because of the nature of the design, particularly since the cooling air is being transferred from static structure to the rotating blades, this presented a leakage problem or a difficult sealing problem. Thus, it was typically a compromise between tolerable leakage and desired cooling air pressure.

By virtue of this invention and since the cooling air feed channel is being replenished with cooling air, the inlet pressure can be at a significantly reduced value, obviating the leakage problem and enhancing engine performance.

As is apparent from the foregoing, the replenishment holes 38 direct the cooling air in the serpentine passages to impinge on the back surface of the airfoil. This not only affords impingement cooling, it also serves as a dirt separator since the air turns to some extent to migrate through the film cooling holes 32. The dirt particles will tend to be captured by the dynamic stream of cooling air in the feed channel 30 where it then will be carried toward the tip of the blade and discharged into the gas path through the discharge orifice 36. Since the blade is rotating, the air including the dirt particles in the feed channel 30 is being centrifuged toward the discharge orifice 36. It is contemplated within the scope of this invention that the replishment holes 38 may be oriented inwardly toward the root of the blade, providing a separation angle of greater than 90° and thereby enhancing dirt separation.

Although this invention has been shown and described with respect to detailed embodiments thereof, it will be understood by those skilled in the art that various changes in form and detail thereof may be made without departing from the spirit and scope of the claimed invention.

We claim:

1. A turbine blade surface for a gas turbine engine having internal passages for flowing cooling air therein, the blade having an airfoil surface defining a root section, a leading edge section, a trailing edge section, a mid chord section, and a tip section, a plurality of radial internal passages defined by internal wall means formed adjacent said trailing edge section and leading edge section extending from said root section to said tip section defining a feed channel, a plurality of radially spaced film cooling holes in said airfoil surface communicating with said feed channel to flow a film of cooling air adjacent said airfoil surface, a plurality of replenishment holes spaced radially in said wall means for flowing cooling air from said mid cord section to said feed channel to replenish the cooling air in said feed channel that is otherwise lost in supplying cooling air to said film cooling holes, and means for communicating cooling air from said root section to discharge from an orifice in said airfoil surface at said tip section, and a source of cooling air for feeding cooling air to said root section.

2. A turbine blade as claimed in claim 1 wherein said orifice at said tip section is sized to minimize the flow of cooling air in said feed chamber to substantially provide a uniform film hole coverage of all the film holes being fed by said feed channel by matching the backflow margin for each radial position in said feed channel.

3. A turbine blade as claimed in claim 1 wherein said feed channel provides means for separating dirt from said cooling air and removing said separated dirt through said discharge orifice.

4. A turbine blade as in claim 1 including trip strips in said feed channel.

5. A turbine blade as in claim 4 wherein said trip strips are skewed relative to the direction of said fuel channel.

* * * * *